United States Patent [19]
Osswald et al.

[11] 4,227,936
[45] Oct. 14, 1980

[54] PROCESS FOR THE PRODUCTION OF READILY DISPERSIBLE PIGMENT PREPARATIONS

[75] Inventors: Günter Osswald, Ludwigsburg; Willy Gouders, Cologne, both of Fed. Rep. of Germany

[73] Assignee: Deutsche Gold- und Silber-Scheideanstalt vormals Roessler, Frankfurt am Main, Fed. Rep. of Germany

[21] Appl. No.: 15,523

[22] Filed: Feb. 23, 1979

[30] Foreign Application Priority Data
Feb. 25, 1978 [DE] Fed. Rep. of Germany ....... 2808223

[51] Int. Cl.³ .......................... C09C 1/26; C09C 3/04
[52] U.S. Cl. .................................... 106/309; 106/304; 106/308 F; 106/308 N; 106/308 M
[58] Field of Search ............... 106/309, 308 F, 308 M, 106/304, 308 Q; 241/16

[56] References Cited
U.S. PATENT DOCUMENTS

| 3,372,878 | 3/1968 | Verdier | 241/16 |
|---|---|---|---|
| 3,954,495 | 5/1976 | Osswald et al. | 106/308 Q |
| 4,013,481 | 3/1977 | Mölls et al. | 106/309 |
| 4,015,999 | 4/1977 | Robertson et al. | 106/309 |
| 4,036,652 | 7/1977 | Rothmayer | 106/304 |
| 4,113,508 | 9/1978 | Einerhand et al. | 106/304 |
| 4,127,421 | 11/1978 | Ferrill | 106/309 |

Primary Examiner—Helen M. McCarthy
Attorney, Agent, or Firm—Beveridge, De Grandi, Kline & Lunsford

[57] ABSTRACT

A process for the production of readily dispersible pigment preparations with a pigment content of more than 65% is disclosed. An aqueous suspension containing 25% to 50% by weight of a pigment is made and kneaded with heating to 60°–70° C. Following addition of a cation-active substance and an oleate, a binder dissolved in an organic solvent is added and a phase inversion takes place whereby water is separated out. After decantation, the organic mass of pigment is kneaded and dried.

2 Claims, No Drawings

PROCESS FOR THE PRODUCTION OF READILY DISPERSIBLE PIGMENT PREPARATIONS

The invention relates to a process for the production of readily dispersible pigment preparations.

Pigment preparations are used for the production of gravure inks, rotary offset inks and carbon papers on wax and plastic bases. They may be easily distributed in the binders by means of a strong stirring apparatus.

It is known to produce pigment preparations for purposes of pigmentation of gravure and rotary offset inks and carbon papers by way of flushing in a kneader (see German Pat. No. 19 40 411, and German AS No. 19 37 832). In that process, aqueous press cake is kneaded with flushing aids and resin solvents until most of the water separates out after the phase inversion. The remaining water, on the one hand, can remain in the preparation which has the disadvantage that resins capable of reactions may enter into uncontrollable reactions therewith; or on the other hand, the water may be driven out by drying on the drum dryer.

The pigment concentration of the pigment preparations produced in accordance with this known process, which are also called resin pigments or pigment concentrates, does not exceed 65%. This means that the known pigment preparations have the disadvantage of introducing a relatively low pigment portion and a relatively high binder portion into the inks that are to be producted.

Thus, for example in the case of Milori blue only a maximum loading limit of the pigment preparations of 65% may be reached. In the case of carbon black, the loading limit is even less than that. A higher loading using known methods will bring about the insolubilization of pigment preparations; i.e., the known production methods of pigment preparations are insufficient in order to maintain the state of dispersion of the pigment in this high pigment concentration.

The object of the invention is a process for the production of readily dispersible pigment preparations with a pigment content of above 65% by weight which is characterized in that the pigment is suspended in water to form a suspension having a solid substance content of 25 to 50% by weight, preferably 30 to 45% by weight, the pigment suspension is heated while kneading to a temperature of 60° to 70° C., a cation-active substance and subsequently an oleate are added, then a binder dissolved in an organic solvent is added while kneading, the emerging water which separates out as a result of phase inversion is decanted, the organic mass of pigment obtained thereby is continued to be kneaded and is subsequently dried.

The drying of the organic mass obtained according to the process of the invention may be carried out in different ways. Thus, the organic mass may be granulated and subsequently dried in a drying cabinet. In a further embodiment, the organic mass may be diluted with toluene in the ratio of 5:1 to 1:1, preferably 3:1, whereby a pumpable paste is obtained, and said mass may be subsequently dried on a drum dryer. The organic mass, in another embodiment of the invention, may be dried directly on a twin roller without any further prior treatment.

For the drying of the product according to the invention, a temperature of 80° to 120° C., preferably to 95° C., is maintained.

In a preferred embodiment of the invention, the pigment preparation may contain at least 85% by weight of pigment. The product according to the invention is obtained as a dust free and free-flowing granulate or in the form of chips which may easily be distributed in binder systems for pigmentation, whereby merely a stirring apparatus needs to be used.

Illustrative of the pigment suspensions that may be used according to the process of the invention there may be mentioned, Berlin blue 35–45% in water, carbon black color 40–50% in water, alkali blue 25–35% in water, crystal violet PMA salt 40–50% in water, and Ruby 4B-Ca-salt 35–45% in water.

Alkali blue is pigment blue 18 with the color index number C.J. 42 770 A. The chemical structure corresponds to a mono sulfonic acid of an incompletely phenylated pararosaniline.

Crystal violet is pigment violet 39 with the color index number C.J. 42 555:2. The chemical structure corresponds to a phosphate molybdate of hexamethylene-p-rosaniline.

Ruby 4B-Ca-salt is pigment red 57:1 with the color index number C.J. 15 850:1. The chemical structure corresponds to the calcium salt of the 6-amino-m-toluene-sulfonic acid-3-hydroxy-2-naphthol acid.

Amines or amine salts may be used as cation-active substance, whereby the concentration used ranges from 5 to 10%, related to the volume of pigment. In a preferred embodiment, one may use the following as a cation-active organic substance:

coconut fatty acid amine acetate oleic acid amine acetate ethoxylated (2 mole EO) primary coconut fatty acid amine ethoxylated (2 mole EO) primary oleic fatty acid amine or ethoxylated (3 mole EO) tallow fatty acid diamine, wherein the ratio of cation-active to oleate amounts to 5:1 to 1:1, preferably 3:1.

The above-identified materials are fatty acid amines, and corresponding salts of monocarboxylic acids, and alkoxylated fatty acid amines which are illustrative of the materials that can be used as cationic substances. Other art recognized equivalent materials can be used for this purpose.

In process of the invention, one may use binder systems as binders which may be composed as follows:

1. Mineral oil/dioctylphthalate/fatty acid alkyl modified imidazoline, wherein the individual components are present in the ratio of 1:1:1 to 1.5:1:0.5.

2. Dioctylphthalate/aliphatically soluble modified phenol resin, wherein the components are present in a ratio of 1:2 to 1.5:1.5.

3. Dioctylphthalate/dehydroabiethylamine/aliphatically soluble modified phenol resin, wherein the components are present in a ratio of 1:1:1 to 2.0:0.5:0.3.

4. Dioctylphthalate/fatty acid alkyl-modified oxazoline/aliphatically soluble modified phenol resin, wherein the components are present in a ratio of 1:1:1.5 to 1:0.5:2.

5. Mineral oil/fatty acid alkyl-modified oxazoline, wherein the components are present in the ratio of 2:1 to 2.5:0.5.

6. Mineral oil/dibutylphthalate/fatty acid alkyl-modified oxazoline/aliphatically soluble modified phenol resin, wherein the components are present in the ratio of 1:1:0.5:1.5 to 1.5:0.5:0.5:1.5.

7. Dibutylphthalate/mineral oil/fatty acid alkyl-modified oxazoline, wherein the components are present in the ratio of 1:0.9:1 to 0.5:1.5:0.9.

The above binder compositions are known in the art and are illustrative of the conventional binders that can be used for purposes of this invention. In general any thermoplastic or thermosetting synthetic resin varnish which is in the nature of plastisols or organosols containing synthetic resins which have been used as printing ink binders in the past may be used for purposes of this invention.

Naphthenic raffinates of the ASTM classification 103 (ASTM-D 2226) may be used as mineral oils. They may have viscosities at 20° C. (DIN 52 562) of 26.5 cSt–54.1 cSt, preferably 31.7 cSt. The aniline points of the mineral oils may lie at 53.5° C. to 55° C., preferably at 52.2° C. The boiling ranges may lie between 295° and 360° C. The density of the mineral oils may range from 0.916 to 0.926 g/ml (DIN 51 757).

Generally, an alkaline or alkaline earth oleate is added. These act as a soap in the preparation.

The invention will be described in more detail in the following examples:

EXAMPLE 1

430 g. of iron blue as a 42.5% aqueous press cake is heated in the kneader to 60° C.

To this is added 25.8 g. of ethoxylated (2 mole EO) primary oleic fatty acid amine suspended in 100 g. of water. After 10 minutes of kneading, 6.5 g. of sodium oleate is added to the mass, which previously had been mixed with 12.5 g. of water and heated to 65° C.

After an additional 10 minutes of kneading, a mixture consisting of
  10 g. dioctylphthalate
  9 g. of mineral oil
  10 g. of fatty acid alkyl-modified oxazoline, (Albaherge C, CSC-chemie) which is dissolved in 60 g. of toluene, is poured into the mass during kneading.

As the mineral oil, a naphthenic raffinate is used of the ASTM classification 103 (ASTM'D 2226) with the following characteristic data:
  Viscosity 20° C. (DIN 52 562): 31.7 cSt
  aniline point: 52.5° C.
  density at 15° C. (DIN 51 757): 0.919 g/ml After 20 minutes of kneading, one will obtain a homogenous organic mass shining like grease, from which water separates itself. The water is decanted. The pigment binder concentrate obtained is diluted with 200 g. of toluene to an readily flowing paste and is subsequently dried on a drum dryer heated to 95° C.

EXAMPLE 2

430 g. of iron blue as a 42.5% aqueous press cake is heated to 60° C. in the kneader.

For the purpose of oleophilation, 25.0 g. ethoxylated (2 mole EO) primary coconut fatty acid amine (dissolved in 100 g. of toluene) is added. After a 10 minute reaction time, 10 g. of a 33% toluene suspension of sodium oleate is added and heated to 60°–70° C.

After an additional 10 minutes of reaction time, the following mixture of binders:
  10 g. of aliphatic soluble, modified phenol resin
  15 g. of dioctylphthalate
  5 g. of fatty acid alkyl-modified oxazoline (as in Example 1)
  10 g. of mineral oil (dissolved in 70 g. of toluene) is added. As the mineral oil, the naphthenic raffinate according to Example 1 is used.

After a 20 minute kneading time, water separates off and is decanted. For the homogenization, the organic mass is kneaded for an additional approximately 10 minutes and is subsequently dried on a heated twin roller (120° C.). The resulting chips are very well soluble in gasoline, mineral oil and offset varnishes.

EXAMPLE 3

387 g. of iron blue as a 42.5% aqueous press cake and 43 g. of Ruby 4B-Ca-salt as a 35% aqueous suspension are heated to 65° C. in a kneader. For the purpose of oleophilation, 30.1 g. of coconut fatty acid amine acetate, dissolved in 110 g. of toluene, are added to the pigment mixture. After 10 minutes of kneading time at 65° C., an additional 15 g. of sodium oleate (as a 33% paste) are added.

After 20 minutes of reaction time, the pigment surface is covered. The binder, which is composed of
  20 g. of aliphatic soluble, modified phenol resin
  10 g. of dioctylphthalate, dissolved in 80 g. of toluene, is poured into the mixture.

After a short time, a flushing process takes place. The water is decanted. The organic mass is homogenized for 20 minutes and subsequently is dried at 80° C. in the drying cabinet. The dry material is ground into granulates by means of a granulating machine.

EXAMPLE 4

370 g. of carbon black color in a 40% water suspension, 43 g. of iron blue as a 42.5% aqueous press cake and 17 g. of alkali blue as a 25% aqueous paste are mixed intensively in the kneader and are heated to 65° C.

For the purpose of surface coating, the 35 g. of ethoxylated (2 mole EO) of primary tallow fatty acid diamine (dissolved in 110 g. of toluene) are added. This is kneaded for 10 minutes at 65° C. and subsequently 12 g. of sodium oleate (with 24 g. of toluene made into a paste) is added. After an additional 10 minutes of reaction time, the binder which has the following composition, is added during kneading:
  13 g. of mineral oil
  10 g. of dioctylphthalate
  10 g. of alkyl-modified imidazoline, (dissolved in 70 g. of toluene). The naphthenic raffinate according to Example 1 is used as the mineral oil.

After 20 minutes the flushing process starts, the separated water is decanted, and the organic mass is homogenized by additional kneading. Subsequently this is dried at 95° C. in the drying cabinet and is granulated with a crusher.

EXAMPLE 5

430 g. of iron blue in the form of a 42.5% aqueous press cake is heated in the kneader to 65° C.

To this, 17.2 g. of ethoxylated (2 mole EO) primary coconut fatty acid amine dissolved in 110 g. of toluene, is added. After 10 minutes of reaction time at 65° C., 6.5 g. of sodium oleate (suspended in 15 g. of toluene) is added during the kneading. After 10 minutes, the reaction is completed. In order to bring about the flushing process, a binder of the following composition is added:
  10 g. of dioctylphthalate
  5 g. of fatty acid alkyl-modified oxazoline (as in Example 1)

10 g. of aliphatic soluble, modified phenol resin (dissolved in 50 g. of toluene).

After about 20 minutes of kneading at 65° C., water separates out and is decanted. For the purpose of homogenizing, the mass is kneaded for an additional 10 minutes.

The pigment binder concentrate is subsequently diluted with 20 g. of toluene. The readily flowing mass resulting from the process as described is dried on the drum dryer at 95° C.

EXAMPLE 6

430 g. of iron blue in the form of a 41% aqueous press cake is heated in the kneader to 65° C., 25.9 g. of ethoxylated (2 mole EO) oleic fatty acid amine (dissolved in 100 g. of toluene) are added while kneading. After 10 minutes of kneading time, 6.5 g. of sodium oleate (made into a paste with 30 g. of toluene) are added. After an additional 10 minutes for bringing about the flushing process, a binder of the following composition of the oleophillic pigment mass is admixed:

10 g. of dioctylophthalate 5 g. of mineral oil 5 g. of fatty acid alkyl-modified oxazoline (as in Example 1)

10 g. of aliphatic soluble, modified phenol resin (dissolved in 40 g. of toluene). The naphthenic raffinate according to Example 1 is used as mineral oil.

After 20 minutes of reaction time, water separates out which is decanted. The pigment binder concentrate is homogenized by additional kneading. Subsequently, it is dried at 95° C. in a drying cabinet.

Further variations of the invention will be apparent to persons having ordinary skill in the art and such variations of the invention are intended to be encompassed by the claims appended hereto.

We claim:

1. A process for the production of readily dispersible pigment preparations with a pigment content of more than 65% by weight, comprising suspending the pigment in water, to form a suspension having a solids content of 25 to 50% by weight, kneading the suspension, heating the pigment suspension while kneading to a temperature of 60° to 70° C., adding to the suspension a cationactive substance and an oleate, adding a binder dissolved in an organic solvent to the suspension while kneading, the water which is expressed from the kneaded suspension and the organic mass obtained thereby is continued to be kneaded and subsequently dried.

2. The process of claim 1 wherein the suspension initially formed has a solids content of 30 to 45% be weight.

* * * * *